United States Patent
Kim et al.

(10) Patent No.: US 9,491,748 B2
(45) Date of Patent: Nov. 8, 2016

(54) HARQ ACK/NACK TRANSMISSION METHOD AND WIRELESS DEVICE

(71) Applicant: LG ELECTRONICS INC., Seoul (KR)

(72) Inventors: Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/403,040

(22) PCT Filed: May 22, 2013

(86) PCT No.: PCT/KR2013/004466
§ 371 (c)(1),
(2) Date: Nov. 21, 2014

(87) PCT Pub. No.: WO2013/176478
PCT Pub. Date: Nov. 28, 2013

(65) Prior Publication Data
US 2015/0131562 A1    May 14, 2015

Related U.S. Application Data

(60) Provisional application No. 61/650,444, filed on May 22, 2012, provisional application No. 61/650,488, filed on May 23, 2012.

(51) Int. Cl.
*H04W 72/04* (2009.01)
*H04L 1/18* (2006.01)
*H04L 5/00* (2006.01)

(52) U.S. Cl.
CPC .......... *H04W 72/042* (2013.01); *H04L 1/1861* (2013.01); *H04L 5/0055* (2013.01); *H04L 5/0094* (2013.01)

(58) Field of Classification Search
CPC ............. H04W 72/042; H04L 1/1861; H04L 5/0055; H04L 5/0094
See application file for complete search history.

(56) References Cited

U.S. PATENT DOCUMENTS

| | | | |
|---|---|---|---|
| 2006/0067279 A1 | 3/2006 | Kim et al. | |
| 2011/0292900 A1 | 12/2011 | Ahn et al. | |
| 2012/0039275 A1* | 2/2012 | Chen ..................... | H04L 1/1607 370/329 |
| 2012/0044889 A1 | 2/2012 | Jen | |
| 2012/0106478 A1 | 5/2012 | Han et al. | |
| 2012/0275400 A1* | 11/2012 | Chen ..................... | H04J 11/0033 370/329 |
| 2013/0195041 A1* | 8/2013 | Papasakellariou .. | H04W 72/042 370/329 |
| 2014/0056244 A1* | 2/2014 | Frenne .................. | H04L 5/0078 370/329 |
| 2014/0140310 A1* | 5/2014 | Liu ........................ | H04W 48/12 370/329 |

FOREIGN PATENT DOCUMENTS

| | | | |
|---|---|---|---|
| KR | 10-2006-0025035 A | 3/2006 | |
| KR | 10-2010-0107393 A | 10/2010 | |
| KR | 10-2012-0047766 A | 5/2012 | |

* cited by examiner

*Primary Examiner* — Chi H Pham
*Assistant Examiner* — Weibin Huang
(74) *Attorney, Agent, or Firm* — Birch, Stewart, Kolasch & Birch, LLP

(57) ABSTRACT

Provided are a method for transmitting a hybrid automatic repeat request (HARQ) positive-acknowledgement (ACK)/negative-acknowledgement (NACK) in a wireless communication system and a wireless device using the same. A resource of an uplink control channel used for the transmission of the HARQ ACK/NACK is determined according to the format of downlink control information.

18 Claims, 13 Drawing Sheets

FIG. 2
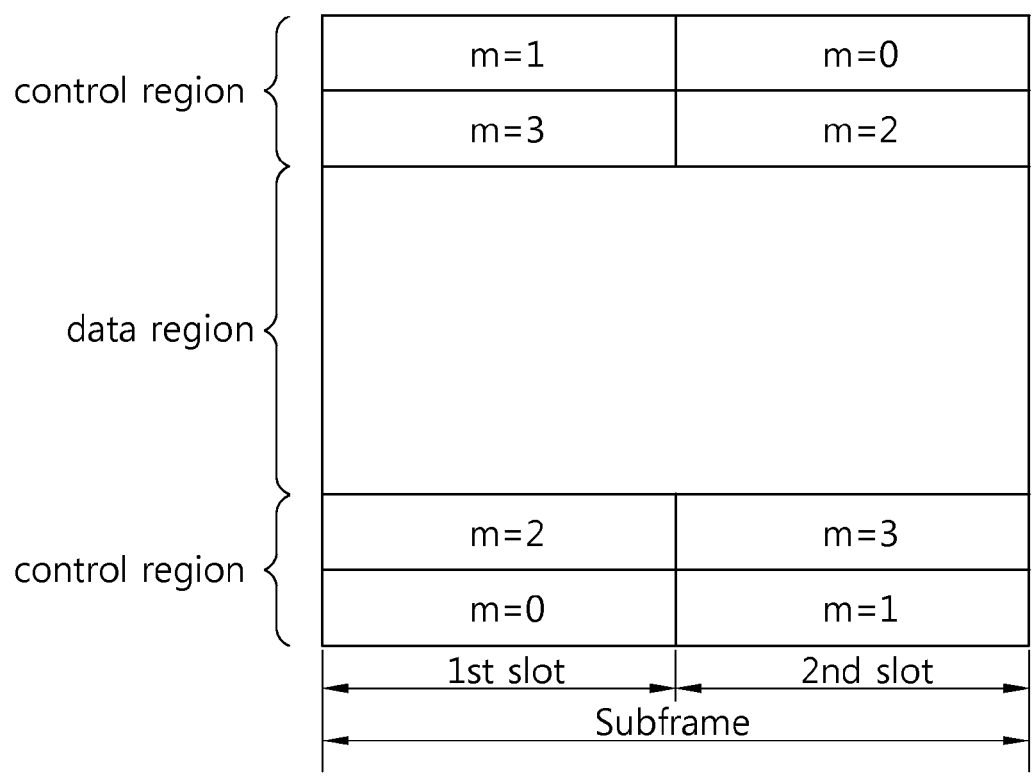
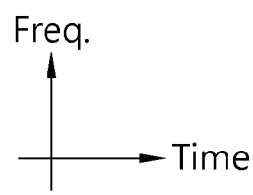

HARQ ACK/NACK TRANSMISSION METHOD AND WIRELESS DEVICE

CROSS REFERENCE TO RELATED APPLICATIONS

This application is the National Phase of PCT International Application No. PCT/KR2013/004466, filed on May 22, 2013, which claims priority under 35 U.S.C. 119(e) to U.S. Provisional Application No. 61/650,444, filed on May 22, 2012 and 61/650,488 filed on May 23, 2012, all of which are hereby expressly incorporated by reference into the present application.

BACKGROUND OF THE INVENTION

1. Field of the Invention

The present invention relates to wireless communications, and more particularly, to a method of transmitting positive-acknowledgement (ACK)/negative-acknowledgement (NACK) for hybrid automatic repeat request (HARQ) in a wireless communication system, and a wireless device using the method.

2. Related Art

Long term evolution (LTE) based on $3^{rd}$ generation partnership project (3GPP) technical specification (TS) release 8 is a promising next-generation mobile communication standard. Recently, LTE-advanced (LTE-A) based on 3GPP TS release 10 supporting multiple carriers is under standardization.

As disclosed in 3GPP TS 36.211 V10.2.0 (2011-06) "Evolved Universal Terrestrial Radio Access (E-UTRA); Physical Channels and Modulation (Release 10)", a physical channel of 3GPP LTE/LTE-A can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

Recently, an enhanced PDCCH (EPDCCH) for more flexible scheduling of a control channel has been introduced. The EPDCCH supports various schemes such as a search space in a PDSCH region, multiple antenna transmission, etc.

For an HARQ operation, a PDCCH-PUCCH resource linkage is established in 3GPP LTE/LTE-A. Upon receiving the PDCCH, a user equipment sends HARQ ACK/NACK through a PUCCH corresponding to the PDCCH by using a resource linkage. This is to implicitly exchange information about to which transport block the HARQ ACK/NACK belongs between a base station and the user equipment.

With the introduction of a new EPDCCH, there is a need to modify the PDCCH-PUCCH resource linkage.

SUMMARY OF THE INVENTION

The present invention provides a method of transmitting positive-acknowledgement (ACK)/negative-acknowledgement (NACK) for hybrid automatic repeat request (HARQ) in a wireless communication system, and a wireless device using the method.

In an aspect, a method for transmitting hybrid automatic repeat request (HARQ) positive-acknowledgement (ACK)/negative-acknowledgement (NACK) in a wireless communication system is provided. The method includes receiving, by a wireless device, downlink control information through a downlink control channel, receiving, by the wireless device, a downlink transport block on a downlink shared channel according to the downlink control information, and transmitting, by the wireless device, ACK/NACK for the downlink transport block on an uplink control channel. A radio resource for the uplink control channel is determined according to a format of the downlink control information and a type of a search in which the downlink control channel is detected.

The format of the downlink control information may be either a first format which does not depend on a transmission mode of the wireless device or a second format which depends on the transmission mode of the wireless device. If the format of the downlink control information is the first format, the radio resource for the uplink control channel may be determined based on a first resource index. If the format of the downlink control information is the second format, the radio resource for the uplink control channel may be determined based on a second resource index.

The first resource index and the second resource index may be acquired from a resource of the downlink control channel.

The first resource index may be acquired from a resource of the downlink control channel, and the second resource index may be pre-defined.

The first resource index may be pre-defined, and the second resource index may be acquired from a resource of the downlink control channel.

In another aspect, a wireless device for transmitting hybrid automatic repeat request (HARQ) positive-acknowledgement (ACK)/negative-acknowledgement (NACK) in a wireless communication system is provided. The wireless device includes a radio frequency (RF) unit configured to transmit and receive a radio signal, and a processor operatively coupled to the RF unit and configured to receive downlink control information through a downlink control channel, receive a downlink transport block on a downlink shared channel according to the downlink control information, and transmit ACK/NACK for the downlink transport block on an uplink control channel. A radio resource for the uplink control channel is determined according to a format of the downlink control information and a type of a search space in which the downlink control channel is detected.

A radio resource for an uplink control channel which is linked to a resource of an enhanced PDCCH (EPDCCH) can be ensured. The radio resource for the uplink control channel can be ensured according to a transmission mode of a user equipment or a format of control information.

BRIEF DESCRIPTION OF THE DRAWINGS

FIG. 2 shows a structure of an uplink (UL) subframe in 3GPP LTE.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS) release 8 or 3GPP LTE-advanced (LTE-A) based on 3GPP TS release 10. However, this is for exemplary purposes only, and thus the present invention is also applicable to various wireless communication networks. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as the CI of the primary cell. It is assumed hereinafter that the CI of the primary cell is 0 and a CI of the secondary cell is allocated sequentially starting from 1.

Figure 1:
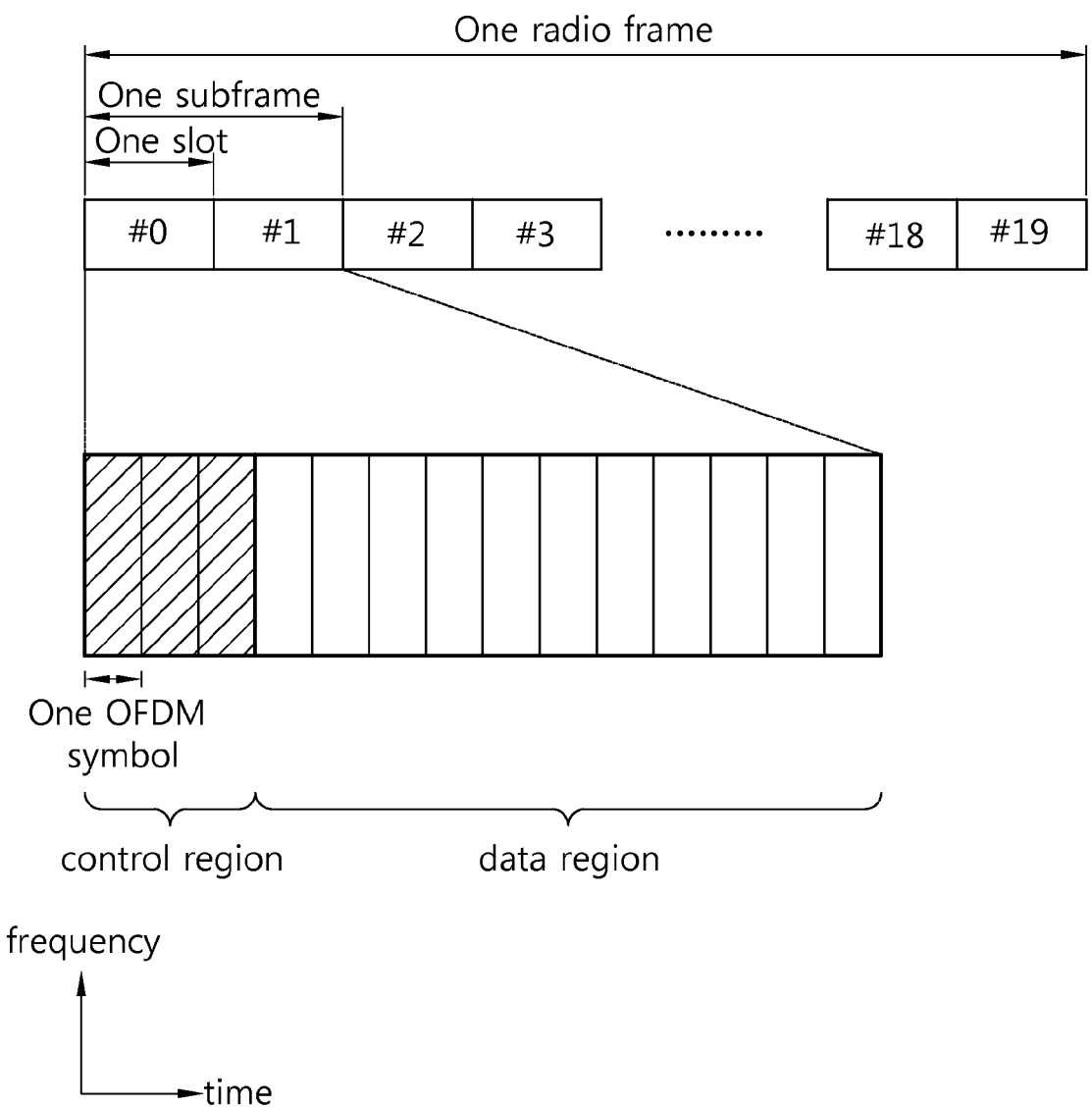
FIG. 1 shows a structure of a downlink (DL) radio frame in $3^{rd}$ generation partnership project (3GPP) long term evolution (LTE).

FIG. 1 shows a structure of a DL radio frame in 3GPP LTE-A. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in multiple access schemes or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CR one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.2.0, examples of a physical control channel in 3GPP LTE/LTE-A include a physical downlink control channel (PDCCH), a physical control format indicator channel (PCFICH), and a physical hybrid-ARQ indicator channel (PHICH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

FIG. 2 shows a structure of a UL subframe in 3GPP LTE.

A UL subframe can be divided into a control region and a data region in frequency domain. The control region is a region to which a physical uplink control channel (PUCCH) is allocated. The data region is a region to which a physical uplink shared channel (PUSCH) is allocated.

The PUCCH is allocated in an RB pair in a subframe. RBs belonging to the RB pair occupy different subcarriers in each of a 1st slot and a 2nd slot. m is a location index indicating a logical frequency-domain location of the RB pair allocated to the PUCCH in the subframe.

It shows that RBs having the same value m occupy different subcarriers in the two slots.

The PUSCH is allocated by a UL grant on a PDCCH. Although not shown, a 4th OFDM symbol of each slot of a normal CP is used in transmission of a demodulation reference signal (DM RS).

Uplink control information (UCI) includes at least any one of HARQ ACK/NACK, channel state information (CSI), and scheduling request (SR). Hereinafter, as an index of indicating a state of a DL channel, the CSI may include at least any one of a channel quality indicator (CQI) and a precoding matrix indicator (PMI).

PUCCH formats are defined as a combination of UCI and PUCCH in order to transmit various UCI on PUCCH.

TABLE 1

| PUCCH format | Transmitted UCI |
| --- | --- |
| PUCCH format 1 | Positive SR |
| PUCCH format 1a/1b | 1 bit or 2 bits HARQ ACCK/NACK |
| PUCCH format 2 | CSI report |
| PUCCH format 2a/2b | CSI report and 1 bit or 2 bits HARQ ACCK/NACK |
| PUCCH format 3 | HARQ ACCK/NACK, SR, CSI |

A PUCCH format 3 can be used to transmit 48 bits encoded UCI. The PUCCH format 3 can carry HARQ ACK/NACK for a plurality of serving cells and a CSI report for a single serving cell.

Hereinafter, transmissions of PDCCH and reference signals are described.

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

Figure 3:
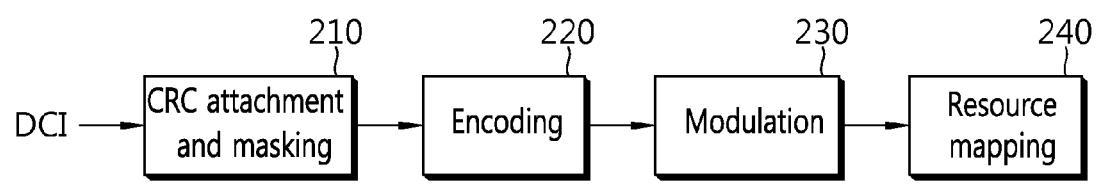
FIG. 3 is a diagram showing a configuration of a physical downlink control channel (PDCCH).

FIG. 3 is a block diagram showing a structure of a PDCCH.

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

A BS determines a PDCCH format according to DCI to be transmitted to a wireless device, attaches a CRC to control information, and masks a unique identifier (referred to as a radio network temporary identifier (RNTI)) to the CRC according to an owner or usage of the PDCCH (block 210).

If the PDCCH is for a specific wireless device, a unique identifier (e.g., cell-RNTI (C-RNTI)) of the wireless device may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the wireless device, a random access-RNTI (RA-RNTI) may be masked to the CRC. To indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data (block 220). Encoding includes channel encoding and rate matching.

The coded data is modulated to generate modulation symbols (block 230).

The modulation symbols are mapped to physical resource elements (REs) (block 240). The modulation symbols are respectively mapped to the REs.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Figure 4:
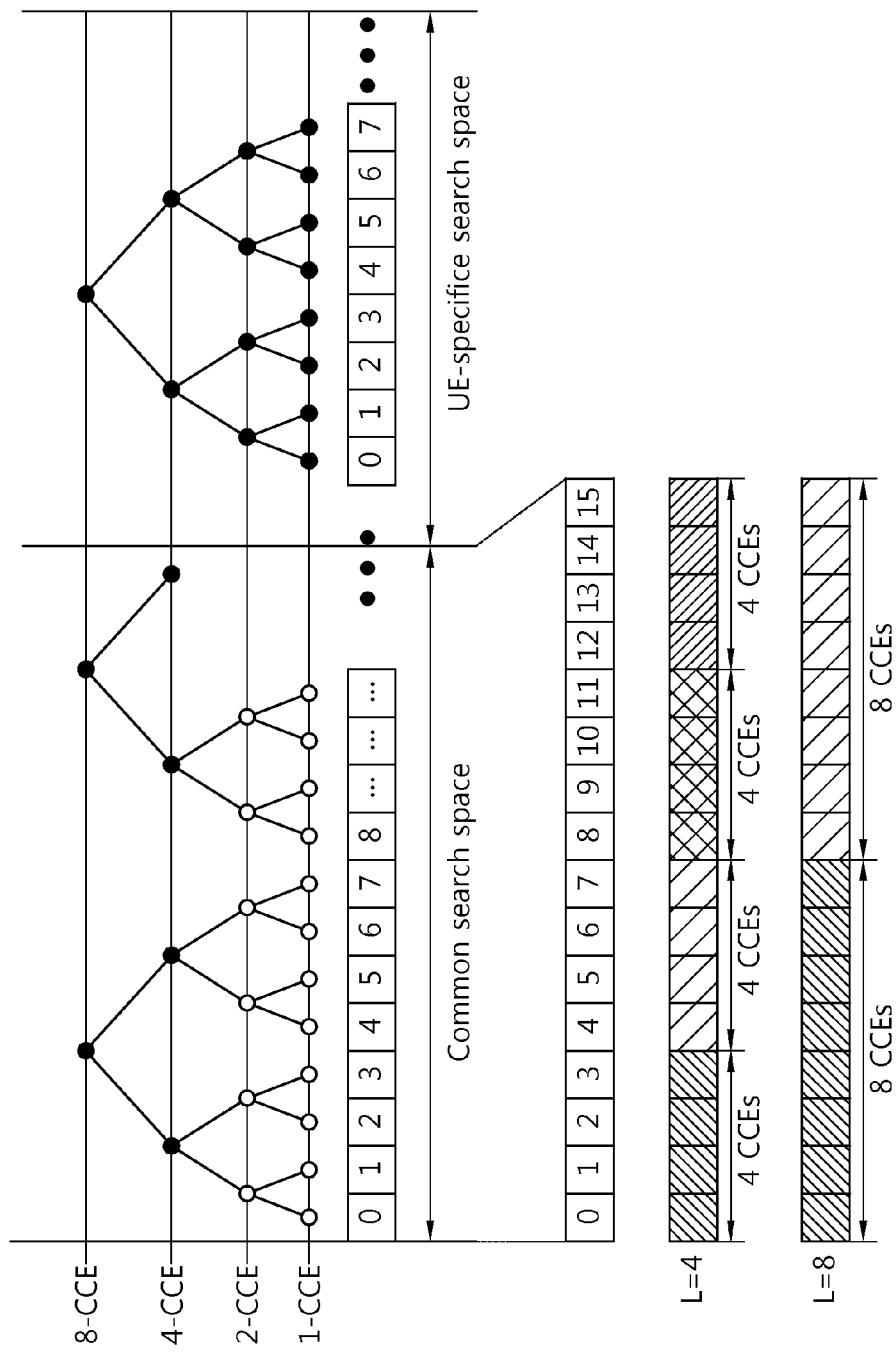
FIG. 4 shows an example of monitoring a PDCCH.

FIG. 4 shows an example of monitoring a PDCCH. The section 9 of 3GPP TS 36.213 V10.2.0 (2011-06) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Table 2 shows the number of PDCCH candidates monitored by the wireless device.

TABLE 2

| Search Space Type | Aggregation level L | Size [In CCEs] | Number of PDCCH candidates | DCI formats |
| --- | --- | --- | --- | --- |
| UE-specific | 1 | 6 | 6 | 0, 1, 1A, 1B, |
|  | 2 | 12 | 6 | 1D, 2, 2A |
|  | 4 | 8 | 2 |  |
|  | 8 | 16 | 2 |  |
| Common | 4 | 16 | 4 | 0, 1A, 1C, |
|  | 8 | 16 | 2 | 3/3A |

A size of the search space is determined by Table 2 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level L∈{1, 2, 3, 4}, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k+m') \bmod \lfloor N_{CCE,k}/L \rfloor\}+i \quad \text{[Equation 1]}$$

Herein, i=0, 1, . . . , L−1, m=0, . . . , $M^{(L)}$−1, and $N_{CCE,k}$ denotes the total number of CCEs that can be used for PDCCH transmission in a control region of a subframe k. The control region includes a set of CCEs numbered from 0 to $N_{CCE,k}$−1 $M^{(L)}$ denotes the number of PDCCH candidates in a CCE aggregation level L of a given search space.

If a carrier indicator field (CIF) is set to the wireless device, m'=m+$M^{(L)}n_{cif}$. Herein, $n_{cif}$ is a value of the CIF. If the CIF is not set to the wireless device, m'=m.

In a common search space, $Y_k$ is set to 0 with respect to two aggregation levels L=4 and L=8.

In a UE-specific search space of the aggregation level L, a variable $Y_k$ is defined by Equation 2 below.

$$Y_k = (A \cdot Y_{k-1}) \bmod D \quad \text{[Equation 2]}$$

Herein, $Y_{-1}=n_{RNTI} \neq 0$, A=39827, D=65537, k=floor($n_s$/2), and $n_s$ denotes a slot number in a radio frame.

When the wireless device monitors the PDCCH by using the C-RNTI, a search space and a DCI format used in monitoring are determined according to a transmission mode of the PDSCH. Table 3 below shows an example of PDCCH monitoring in which the C-RNTI is set.

TABLE 3

| Transmission mode | DCI format | search space | Transmission mode of PDSCH based on PDCCH |
| --- | --- | --- | --- |
| Mode 1 | DCI format 1A | common and UE specific | Single antenna port, port 0 |
|  | DCI format 1 | UE specific | Single antenna port, port 0 |
| Mode 2 | DCI format 1A | common and UE specific | Transmit diversity |
|  | DCI format 1 | UE specific | Transmit diversity |
| Mode 3 | DCI format 1A | common and UE specific | Transmit diversity |
|  | DCI format 2A | UE specific | CDD (Cyclic Delay Diversity) or Transmit diversity |
| Mode 4 | DCI format 1A | common and UE specific | Transmit diversity |
|  | DCI format 2 | UE specific | Closed-loop spatial multiplexing |
| Mode 5 | DCI format 1A | common and UE specific | Transmit diversity |
|  | DCI format 1D | UE specific | MU-MIMO (Multi-user Multiple Input Multiple Output) |
| Mode 6 | DCI format 1A | common and UE specific | Transmit diversity |
|  | DCI format 1B | UE specific | Closed-loop spatial multiplexing |
| Mode 7 | DCI format 1A | common and UE specific | If the number of PBCH transmission ports is 1, single antenna port, port 0, otherwise Transmit diversity |
|  | DCI format 1 | UE specific | Single antenna port, port 5 |
| Mode 8 | DCI format 1A | common and UE specific | If the number of PBCH transmission ports is 1, single antenna port, port 0, otherwise, Transmit diversity |
|  | DCI format 2B | UE specific | Dual layer transmission (port 7 or 8), or single antenna port, port 7 or 8 |

Figure 5:
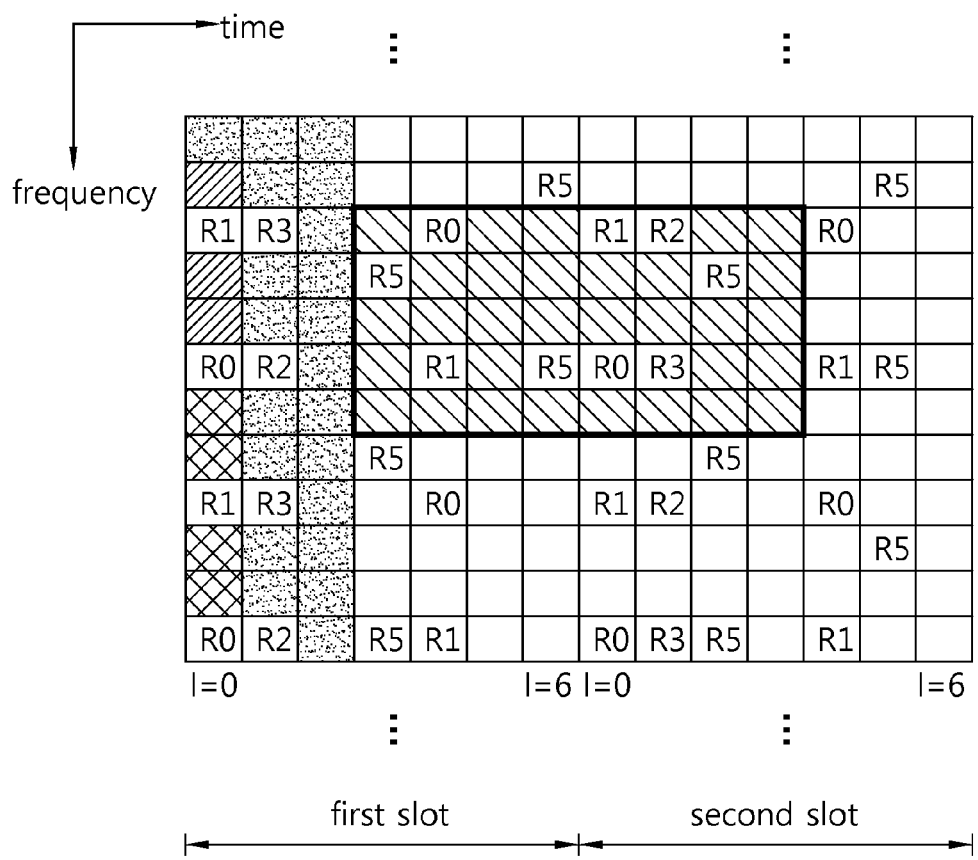
FIG. 5 shows an example of arranging a reference signal and a control channel in a DL subframe of 3GPP LTE.

FIG. 5 shows an example of arranging a reference signal and a control channel in DL subframe of 3GPP LTE.

A control region (or a PDCCH region) includes first three OFDM symbols, and a data region in which a PDSCH is transmitted includes the remaining OFDM symbols.

A PCFICH, a PHICH, and/or a PDCCH are transmitted in the control region. A control format indictor (CFI) of the PCFICH indicates three OFDM symbols. A region excluding a resource in which the PCFICH and/or the PHICH are transmitted in the control region is a PDCCH region which monitors the PDCCH.

Various reference signals are transmitted in the subframe.

A cell-specific reference signal (CRS) may be received by all wireless devices in a cell, and is transmitted across a full downlink frequency band. In FIG. 4, 'R0' indicates a resource element (RE) used to transmit a CRS for a first antenna port, 'R1' indicates an RE used to transmit a CRS for a second antenna port, 'R2' indicates an RE used to transmit a CRS for a third antenna port, and 'R3' indicates an RE used to transmit a CRS for a fourth antenna port.

An RS sequence $r_{l,ns}(m)$ for a CRS is defined as follows, $$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

Herein, m=0, 1, . . . , $2N_{maxRB}$−1. $N_{maxRB}$ is the maximum number of RBs. ns is a slot number in a radio frame. l is an OFDM symbol index in a slot.

A pseudo-random sequence c(i) is defined by a length-31 gold sequence as follows.

$$c(n)=(x_1(n+Nc)+x_2(n+Nc)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 4]}$$

Herein, Nc=1600, and a first m-sequence is initialized as $x_1(0)=1$, $x_1(n)=0$, m=1, 2, . . . , 30.

A second m-sequence is initialized as $c_{init}=2^{10}(7(ns+1)+l+1)(2N^{cell}_{ID}+1)+2 \ N^{cell}_{ID}+N_{CP}$ at a start of each OFDM symbol. $N^{cell}_{ID}$ is a physical cell identifier (PCI). $N_{CP}=1$ in a normal CP case, and $N_{CP}=0$ in an extended CP case.

A UE-specific reference signal (URS) is transmitted in the subframe. Whereas the CRS is transmitted in the entire region of the subframe, the URS is transmitted in a data region of the subframe and is used to demodulate the PDSCH. In FIG. 4, 'R5' indicates an RE used to transmit the URS. The URS is also called a dedicated reference signal (DRS) or a demodulation reference signal (DM-RS).

The URS is transmitted only in an RB to which a corresponding PDSCH is mapped. Although R5 is indicated in FIG. 4 in addition to a region in which the PDSCH is transmitted, this is for indicating a location of an RE to which the URS is mapped.

The URS is used only by a wireless device which receives a corresponding PDSCH. A reference signal (RS) sequence $r_{ns}(m)$ for the URS is equivalent to Equation 3. In this case, m=0, 1, . . . , $12N_{PDSCH,RB}-1$, and $N_{PDSCH,RB}$ is the number of RBs used for transmission of a corresponding PDSCH. A pseudo-random sequence generator is initialized as $c_{init}=$ (floor(ns/2)+1)(2 $N^{cell}_{ID}+1)2^{16}+n_{RNTI}$ at a start of each subframe. $n_{RNTI}$ is an identifier of the wireless device.

The aforementioned initialization method is for a case where the URS is transmitted through the single antenna, and when the URS is transmitted through multiple antennas, the pseudo-random sequence generator is initialized as $c_{init}=$ (floor(ns/2)+1)(2 $N^{cell}_{ID}+1)2^{16}+n_{SCID}$ at a start of each subframe. $n_{SCID}$ is a parameter acquired from a DL grant (e.g., a DCI format 2B or 2C) related to PDSCH transmission.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 6:
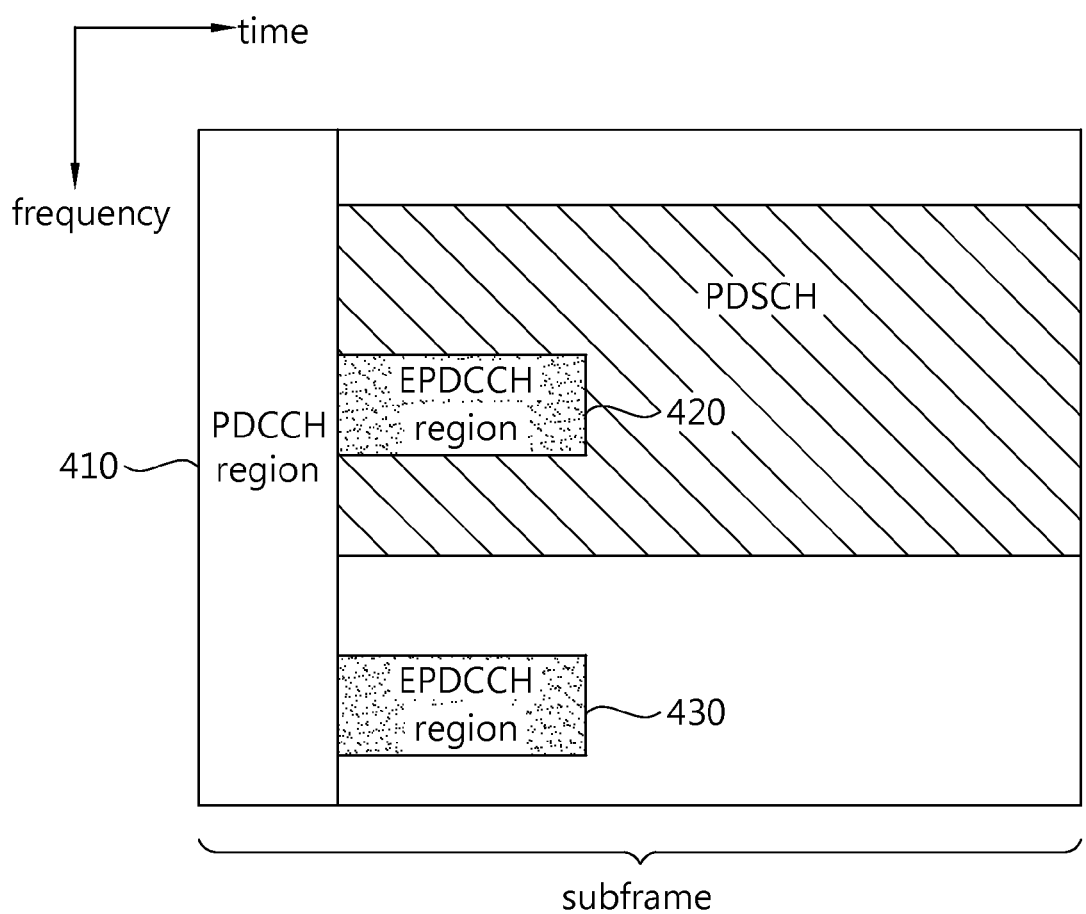
FIG. 6 shows an example of a subframe having an enhanced PDCCH (EPDCCH).

FIG. 6 is an example of a subframe having an EPDCCH.

The subframe may include zero or one PDCCH region 410 and zero or more EPDCCH regions 420 and 430.

The EPDCCH regions 420 and 430 are regions in which a wireless device monitors the EPDCCH. The PDCCH region 410 is located in up to first four OFDM symbols of the subframe, whereas the EPDCCH regions 420 and 430 may be flexibly scheduled in an OFDM symbol located after the PDCCH region 410.

One or more EPDCCH regions 420 and 430 may be assigned to the wireless device. The wireless device may monitor EPDDCH data in the assigned EPDCCH regions 420 and 430.

The number/location/size of the EPDCCH regions 420 and 430 and/or information regarding a subframe for monitoring the EPDCCH may be reported by a BS to the wireless device by using a radio resource control (RRC) message or the like.

In the PDCCH region 410, a PDCCH may be demodulated on the basis of a CRS. In the EPDCCH regions 420 and 430, instead of the CRS, a DM-RS may be defined for demodulation of the EPDCCH. An associated DM-RS may be transmitted in the EPDCCH regions 420 and 430.

An RS sequence for the associated DM-RS is equivalent to Equation 3. In this case, m=0, 1, . . . , $12N_{RB}-1$, and $N_{RB}$ is a maximum number of RBs. A pseudo-random sequence generator may be initialized as $c_{init}=$(floor(ns/2)+1) (2 $N_{EPDCCH,ID}+1)2^{16}+n_{EPDCCH,SCID}$ at a start of each subframe. ns is a slot number of a radio frame. $N_{EPDCCH,ID}$ is a cell index related to a corresponding EPDCCH region. $n_{EPDCCH,SCID}$ is a parameter given from higher layer signaling.

Each of the EPDCCH regions 420 and 430 may be used to schedule a different cell. For example, an EPDCCH in the EPDCCH region 420 may carry scheduling information for a primary cell, and an EPDCCH in the EPDCCH region 430 may carry scheduling information for a secondary cell.

When the EPDCCH is transmitted through multiple antennas in the EPDCCH regions 420 and 430, the same precoding as that used in the EPDCCH may be applied to a DM-RS in the EPDCCH regions 420 and 430.

Comparing with a case where the PDCCH uses a CCE as a transmission resource unit, a transmission resource unit for the EPDCCH is called an enhanced control channel element (ECCE). An aggregation level may be defined as a resource unit for monitoring the EPDCCH. For example, when 1 ECCE is a minimum resource for the EPDCCH, it may be defined as an aggregation level L={1, 2, 4, 8, 16}.

An EPDCCH search space may corresponds to an EPDCCH region. One or more EPDCCH candidates may be monitored at one or more aggregation levels in the EPDCCH search space.

Now, resource allocation for an EPDCCH will be described.

The EPDCCH is transmitted by using one or more ECCEs. The ECCE includes a plurality of enhanced resource element groups (EREGs). According to a CP and a subframe type based on a time division duplex (TDD) DL-UL configuration, the ECCE may include 4 EREGs or 8 EREGs. For example, the ECCE may include 4 EREGs in a normal CP case, and may include 8 EREGs in an extended CP case.

A physical resource block (PRB) pair is 2 PRBs having the same RB number in one subframe. The PRB pair is a first PRB of a first slot and a second PRB of a second slot in the same frequency domain. In the normal CP case, the PRB pair includes 12 subcarriers and 14 OFDM symbols, and thus includes 168 resource elements (REs).

Figure 7:
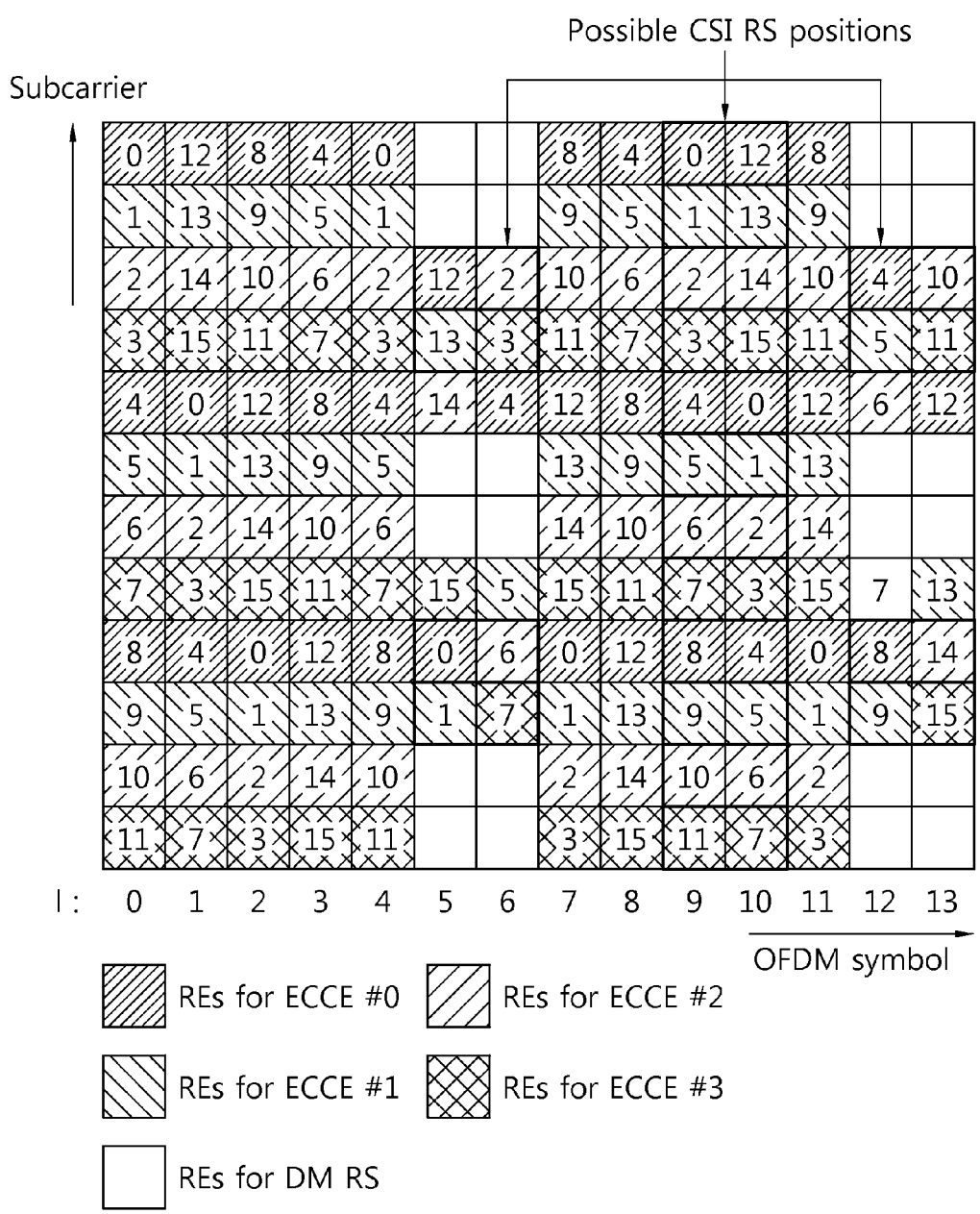
FIG. 7 shows an example of a physical resource block (PRB) pair.

FIG. 7 shows an example of a PRB pair. Although it is assumed hereinafter that a subframe includes 2 slots and a PRB pair in one slot includes 7 OFDM symbols and 12 subcarriers, the number of OFDM symbols and the number of subcarriers are for exemplary purposes only.

In one subframe, the PRB pair includes 168 REs in total. 16 EREGs are configured from 144 REs, except for 24 REs for a DM RS. Therefore, 1 EREG may include 9 REs. However, a CRS-RS or a CRS may be placed to one PRB pair, in addition to the DM RS. In this case, the number of available REs may be decreased, and the number of REs included in 1 EREG may be decreased. The number of REs included in the EREG may be changed, whereas there is no change in the number (i.e., 16) of EREGs included in one PRB pair.

In this case, as shown in FIG. 7, an RE index may be assigned sequentially starting from a first subcarrier of a first OFDM symbol (l=0). Assume that 16 EREGs are indexed from 0 to 15. In this case, 9 REs having an RE index 0 are assigned to an EREG 0. Likewise, 9 REs corresponding to an RE index k 15) are assigned to an EREG k.

An EREG group is defined by aggregating a plurality of EREGs. For example, if an EREG group having 4 EREGs is defined, it may be defined as an EREG group #0={EREG 0, EREG 4, EREG 8, EREG 12}, an EREG group #1={EREG 1, EREG 5, EREG 9, EREG 3}, an EREG group #2={EREG 2, EREG 6, EREG 10, EREG 14}, and an EREG group #3={EREG 3, EREG 7, EREG 11, EREG 15}. If an EREG group having 8 EREGs is defined, it may be defined as an EREG group #0={EREG 0, EREG 2, EREG 4, EREG 6, EREG 8, EREG 10, EREG 12, EREG 14} and an EREG group #1={EREG 1, EREG 3, EREG 5, EREG 7, EREG 9, EREG 11, EREG 13, EREG 15}.

As described above, the ECCE may include 4 EREGs. In an extended CP case, the ECCE may include 8 EREGs. The ECCE is defined by the EREG group. For example, it is exemplified in FIG. 6 that an ECCE #0 includes an EREG group #0, an ECCE #1 includes an EREG group #1, an ECCE #2 includes an EREG group #2; and an ECCE #3 includes an EREG group #3.

ECCE-to-EREG mapping has two types of transmission, i.e., localized transmission and distributed transmission. In the localized transmission, an EREG group constituting one ECCE is selected from EREGs of one PRB pair. In the distributed transmission, an EREG constituting one ECCE is selected from EREGs of different PRB pairs.

Now, a DL HARQ operation and a PUCCH structure will be described.

Figure 8:
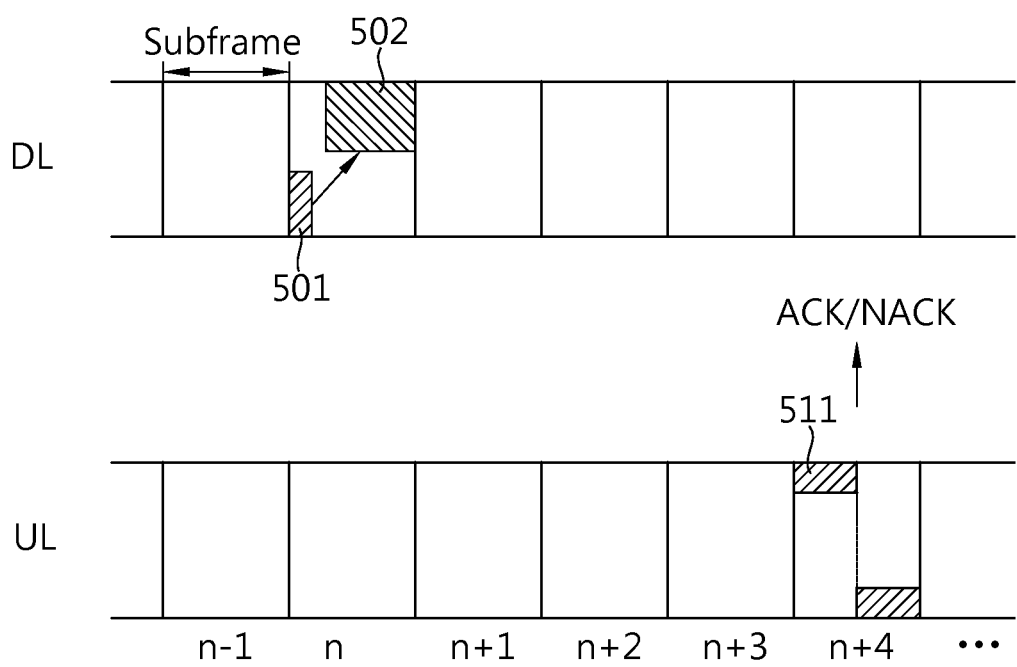
FIG. 8 shows a DL hybrid automatic repeat request (HARQ) operation in 3GPP LTE.

FIG. 8 shows a DL HARQ operation in 3GPP LTE.

A wireless device monitors a PDCCH, and receives a DL grant including a DL resource allocation on a PDCCH 501 (or EPDDCH) in an $n^{th}$ DL subframe. The wireless device receives a DL transport block through a PDSCH 502 indicated by the DL resource allocation.

The wireless device transmits an ACK/NACK signal for the DL transport block on a PUCCH 511 in an $(n+4)^{th}$ UL subframe. The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until the number of retransmission attempts reaches its maximum number.

In 3GPP LTE, PUCCH formats 1a/1b/3 are used to carry an ACK/NACK signal which is a reception acknowledgement for HARQ.

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence $r_u(n)$ is defined by the following equation.

$$r_u(n) = e^{jb(n)\pi/4} \quad \text{[Equation 5]}$$

Herein, u denotes a root index, and n denotes a component index in the range of $0 \leq n \leq N-1$, where N is a length of the base sequence. b(n) is defined in the section 5.5 of 3GPP TS 36.211 V10.2.0.

A length of a sequence is equal to the number of elements included in the sequence. u can be determined by a cell identifier (ID), a slot number in a radio frame, etc. When it is assumed that the base sequence is mapped to one resource block in a frequency domain, the length N of the base sequence is 12 since one resource block includes 12 subcarriers. A different base sequence is defined according to a different root index.

The base sequence r(n) can be cyclically shifted by the following equation to generate a cyclically shifted sequence $r(n, I_{cs})$.

$$r(n, I_{cs}) = r(n) \cdot \exp\left(\frac{j2\pi I_{cs} n}{N}\right), \quad \text{[Equation 6]}$$
$$0 \leq I_{cs} \leq N-1$$

Herein, $I_{cs}$ denotes a CS index indicating a CS amount ($0 \leq I_{cs} \leq N-1$).

Hereinafter, the available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

Figure 9:
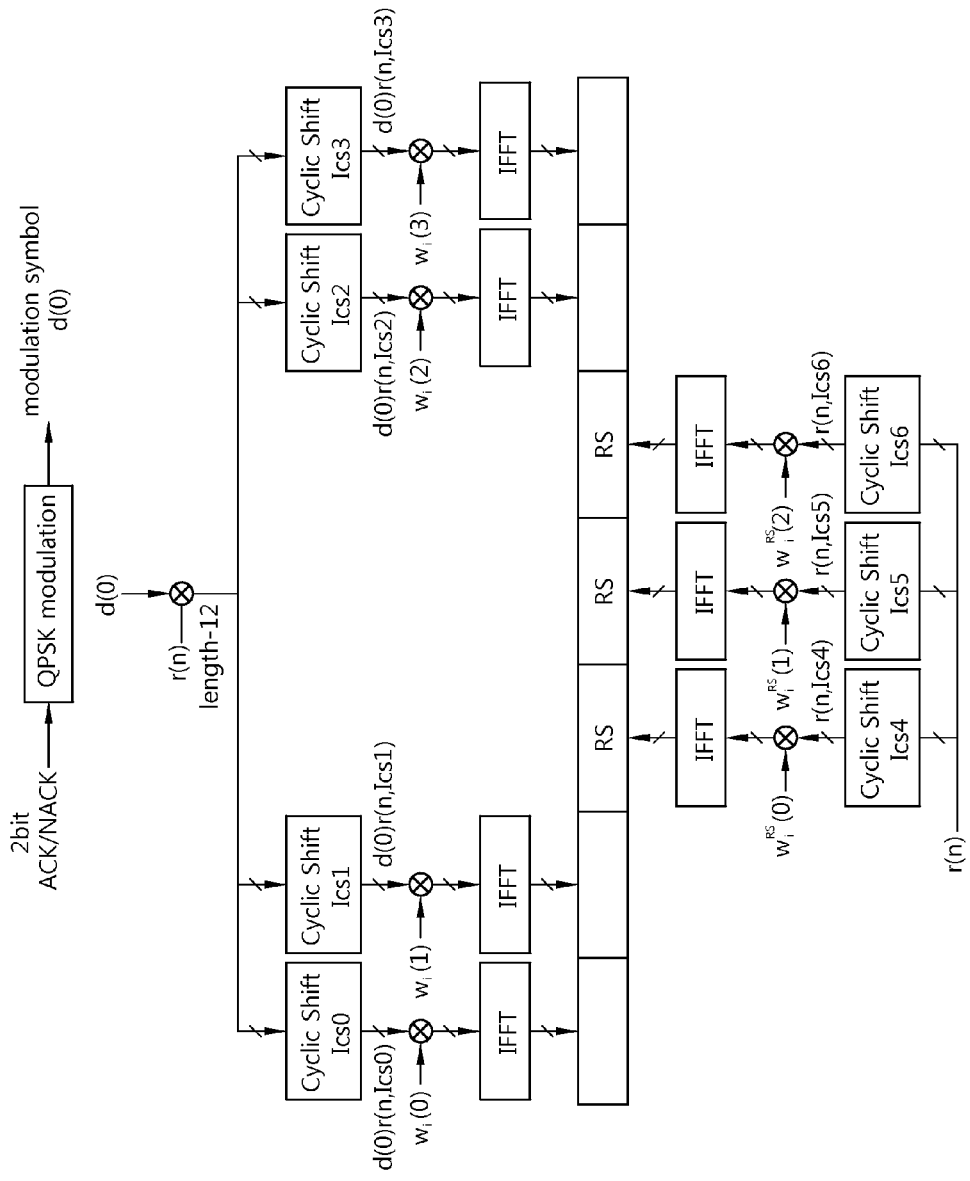
FIG. 9 shows transmission of a positive-acknowledgement (ACK)/negative-acknowledgement (NACK) signal when a physical uplink control channel (PUCCH) format 1b is used in a normal cyclic prefix (CP) case in 3GPP LTE.

FIG. 9 shows transmission of an ACK/NACK signal when a PUCCH format 1b is used in a normal CP case in 3GPP LTE.

One slot includes 7 OFDM symbols. Three OFDM symbols are reference signal (RS) OFDM symbols for an RS. Four OFDM symbols are data OFDM symbols for an ACK/NACK signal.

In the PUCCH format 1b, a modulation symbol d(0) is generated by modulating a 2-bit ACK/NACK signal based on quadrature phase shift keying (QPSK).

A CS index $I_{cs}$ may vary depending on a slot number $n_s$ in a radio frame and/or a symbol index 1 in a slot.

In the normal CP case, there are four data OFDM symbols for transmission of the ACK/NACK signal in one slot. Therefore, assume that CS indices corresponding to the respective data OFDM symbols are denoted by $I_{cs0}$, $L_{cs1}$, $I_{cs2}$, and $I_{cs3}$).

The modulation symbol d(0) is spread to a cyclically shifted sequence $r(n, I_{cs})$. When a one-dimensional spreading sequence corresponding to an $(i+1)^{th}$ OFDM symbol in a slot is denoted by m(i), it can be expressed as follows.

{m(0), m(1), m(2), m(3)}={d(0)r(n,$I_{cs0}$), d(0)r(n,$I_{cs1}$), d(0)r(n,$I_{cs2}$), d(0)r(n,$I_{cs3}$)}

In order to increase UE capacity, the one-dimensional spreading sequence can be spread by using an orthogonal sequence. An orthogonal sequence $w_i(k)$ (where i is a sequence index, $0 \leq k \leq K-1$) based on a spread factor K is as follows.

TABLE 4

| Index (i) | K = 4 [$w_i(0)$, $w_i(1)$, $w_i(2)$, $w_i(3)$] | K = 3 [$w_i(0)$, $w_i(1)$, $w_i(2)$] |
|---|---|---|
| 0 | [+1, +1, +1, +1] | [+1, +1, +1] |
| 1 | [+1, −1, +1, −1] | [+1, $e^{j2\pi/3}$, $e^{j4\pi/3}$] |
| 2 | [+1, −1, −1, +1] | [+1, $e^{j4\pi/3}$, $e^{j2\pi/3}$] |

A different spread factor can be used for each slot.

Therefore, when any orthogonal sequence index i is given, two-dimensional spreading sequences {s(0), s(1), s(2), s(3)} can be expressed as follows.

{s(0),s(1),s(2),s(3)}={$w_i$(0)m(0),$w_i$(1)m(1),$w_i$(2)m(2), $w_i$(3)m(3)}

The two-dimensional spreading sequences {s(0), s(1), s(2), s(3)} are subjected to inverse fast Fourier transform (IFFT) and thereafter are transmitted in corresponding OFDM symbols. Accordingly, the ACK/NACK signal is transmitted on a PUCCH.

An RS of the PUCCH format 1b is also transmitted by cyclically shifting the base sequence r(n) and then by spreading it by the use of an orthogonal sequence. When CS indices corresponding to three RS OFDM symbols are denoted by $I_{cs4}$, $I_{cs5}$, and $I_{cs6}$, three cyclically shifted sequences $r(n,I_{cs4})$, $r(n,I_{cs5})$, and $r(n,I_{cs6})$ can be obtained. The three cyclically shifted sequences are spread by the use of an orthogonal sequence $w^{RS}_i(k)$ having a spreading factor K=3.

An orthogonal sequence index i, a CS index $I_{cs}$, and a resource block index m are parameters required to construct the PUCCH, and are also resources used to identify the PUCCH (or UE). If the number of available cyclic shifts is 12 and the number of available orthogonal sequence indices is 3, PUCCHs for 36 UEs in total can be multiplexed to one resource block.

In the 3GPP LTE, a resource index $n^{(1)}_{PUCCH}$ is defined in order for the UE to obtain the three parameters for constructing the PUCCH. The resource index $n^{(1)}_{PUCCH}$ is defined to $n_{CCE}+N^{(1)}_{PUCCH}$, where $n_{CCE}$ is a number indicating a first CCE used for transmission of a corresponding DCI (i.e., a DL resource allocation used to receive DL data corresponding to an ACK/NACK signal), and $N^{(1)}_{PUCCH}$ is a parameter reported by a BS to the UE by using a higher-layer message.

To configure a resource index for the PUCCH, the UE uses a resource allocation of a PDCCH. That is, a lowest CCE index (or an index of a first CCE) used for transmission of the PDCCH is $n_{CCE}$, and the resource index is determined as $n^{(1)}_{PUCCH}=n_{CCE}+N^{(1)}_{PUCCH}$.

Time, frequency, and code resources used for transmission of the ACK/NACK signal are referred to as ACK/NACK resources or PUCCH resources. As described above, an index of the ACK/NACK resource required to transmit the ACK/NACK signal on the PUCCH (also referred to as an ACK/NACK resource index or a PUCCH index) can be expressed with at least any one of an orthogonal sequence index i, a CS index $I_{cs}$, a resource block index m, and a PUCCH index $n^{(1)}_{PUCCH}$ for obtaining the three indices. The ACK/NACK resource may include at least any one of an orthogonal sequence, a cyclic shift, a resource block, and a combination thereof.

Figure 10:
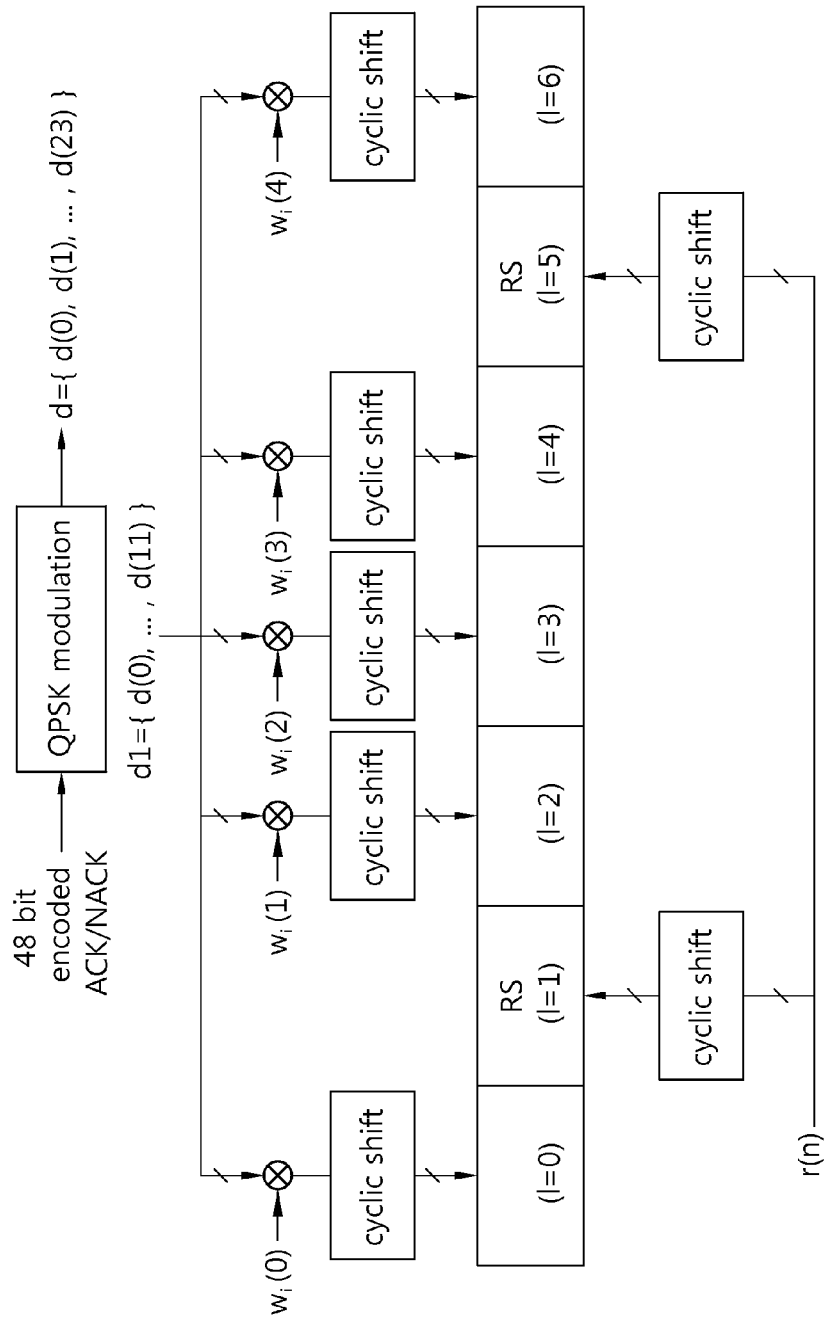
FIG. 10 shows a structure of a PUCCH format 3 in a normal CP case.

FIG. 10 shows a structure of a PUCCH format 3 in a normal CP case.

One slot includes 7 OFDM symbols. l denotes an OFDM symbol number in the slot, and has a value in the range of 0 to 6. Two OFDM symbols with l=1, 5 are used as RS OFDM symbols for a reference signal, and the remaining OFDM symbols are used as data OFDM symbols for a UCI signal.

A symbol sequence d={d(0), d(1), . . . , d(23)} is generated by performing quadrature phase-shift keying (QPSK) modulation on 48-bit encoded UCI (e.g., encoded ACK/NACK). d(n)(n=0, 1, . . . , 23) is a complex-valued modulation symbol. The symbol sequence d can be regarded as a set of modulation symbols. The number of bits of the UCI or a modulation scheme is for exemplary purposes only, and thus the present invention is not limited thereto.

One PUCCH uses one resource block (RB), and one subframe includes a first slot and a second slot. A symbol sequence d={d(0), d(1), d(23)} is divided into two sequences d1={d(0), . . . , d(11)} and d2={d(12), . . . , d(23)}, each having a length of 12. The first sequence d1 is transmitted in the first slot, and the second sequence d2 is transmitted in the second slot. In FIG. 3, the first sequence d1 is transmitted in the first slot.

The symbol sequence is spread with an orthogonal sequence $w_i$. Symbol sequences correspond to respective data OFDM symbols. An orthogonal sequence is used to identify a PUCCH (or wireless device) by spreading the symbol sequence across the data OFDM symbols.

An orthogonal sequence $w_i(k)$ (i is a sequence index, $0 \le k \le K-1$) based on a spreading factor K is as follows.

TABLE 5

| Index (i) | K = 5<br>[$w_i(0)$, $w_i(1)$, $w_i(2)$, $w_i(3)$, $w_i(3)$] | K = 4<br>[$w_i(0)$, $w_i(1)$, $w_i(2)$, $w_i(2)$] |
|---|---|---|
| 0 | [+1, +1, +1, +1] | [+1, +1, +1, +1] |
| 1 | [+1, $e^{j2\pi/5}$, $e^{j4\pi/5}$, $e^{j6\pi/5}$, $e^{j8\pi/5}$] | [+1, −1, +1, −1] |
| 2 | [+1, $e^{j4\pi/5}$, $e^{j8\pi/5}$, $e^{j2\pi/5}$, $e^{j6\pi/5}$] | [+1, +1, −1, −1] |
| 3 | [+1, $e^{j6\pi/5}$, $e^{j2\pi/5}$, $e^{j8\pi/5}$, $e^{j4\pi/5}$] | [+1, −1, −1, +1] |
| 4 | [+1, $e^{j8\pi/5}$, $e^{j6\pi/5}$, $e^{j4\pi/5}$, $e^{j2\pi/5}$] | — |

In two RS OFDM symbols, an RS sequence used in UCI demodulation is mapped and transmitted.

In the PUCCH format 3, only the orthogonal sequence is used to distinguish wireless devices. To allocate the orthogonal sequence for the PUCCH format 3, a resource index may be defined similarly to the PUCCH format 1. A BS allocates a resource index set for the PUCCH format 3 in advance to the wireless device through an RRC message. In addition, a resource index to be used in the resource index set is directly indicated by the DL grant.

Now, a PUCCH resource allocation based on an EPDCCH will be described according to an embodiment of the present invention.

Scheduling can be performed more flexibly in the EPDCCH than in a PDCCH. However, when the number of OFDM symbols is determined, unlike the PDCCH in which the total number of CCEs is determined, the number of ECCEs is determined in the EPDCCH according to an arrangement of a reference signal in a corresponding subframe even if the number of PRB pairs is determined. This implies that, even if the ECCE is located in the same position, an index thereof may change according to a subframe.

Further, considering that 1 PRB includes 4 ECCEs and 1 ECCE can transmit one DCI, a PUCCH resource index corresponding to an ECCE index may be insufficient. For example, a plurality of ECCE indices can be mapped to one PUCCH resource index.

In addition, regarding the EPDCCH, unlike 3GPP LTE in which only one PDCCH is monitored in one search space, the EPDCCH may be monitored in each of a plurality of search spaces.

Figure 11:
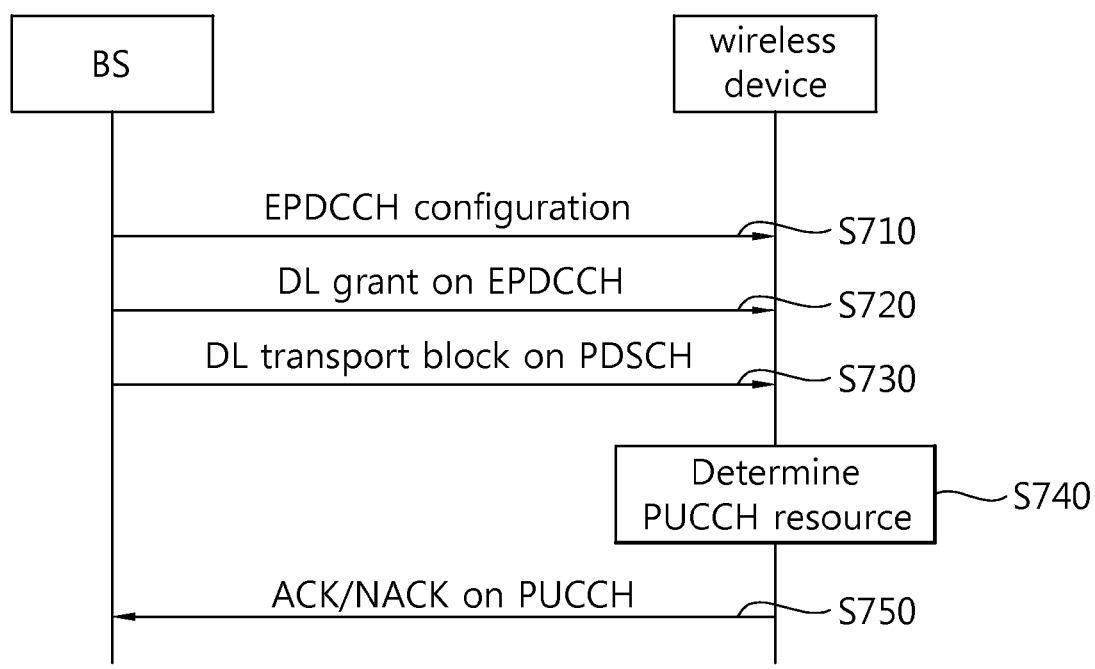
FIG. 11 is a flowchart showing an ACK/NACK transmission method according to an embodiment of the present invention.

FIG. 11 is a flowchart showing an ACK/NACK transmission method according to an embodiment of the present invention.

In step S710, a wireless device receives an EPDCCH configuration. The EPDCCH configuration may include information regarding one or more EPDCCH sets. The EPDCCH set may correspond to one search space in which the EPDCCH is monitored, and may include one or more PRB pairs (or PRBs). For example, the EPDCCH set may include at least any one of the following fields.

TABLE 6

| Field | Content |
|---|---|
| Identifier | Identifier of EPDCCH set (or also referred to as EPDCCH set index) |
| Transport type | To indicate distributed transmission or local transmission |
| RB allocation | PRB pair for EPDCCH set |
| PUCCH offset | Offset for PUCCH resource |
| RS scramble identifier | Scrambling sequence initialization parameter of DM RS for EPDCCH |

In step S720, the wireless device monitors the configured EPDCCH set, and receives a DL grant on the EPDCCH.

In step S730, the wireless device receives a DL transport block on a PDSCH indicated by the DL grant.

In step S740, the wireless device acquires a PUCCH resource on the basis of the EPDCCH resource.

In step S750, the wireless device transmits ACK/NACK for the DL transport block on the PUCCH on the basis of the PUCCH resource.

Now, an embodiment for acquiring a PUCCH resource will be described.

A PUCCH resource may be acquired based on a resource by which a successfully decoded EPDCCH is detected within an EPDCCH set. The resource may include at least any one of an EPDCCH set index, a PRB index, a PRB pair index, an ECCE index, and an EREG index.

The PUCCH formats 1a/1b/3 may be used in ACK/NACK transmission, and a resource index is used to configure a PUCCH resource for a corresponding PUCCH format. Hereinafter, a detailed embodiment for acquiring a resource index will be described.

For example, a resource index $n^{(1)}_{PUCCH}$ may be defined as follows.

$$n_{PUCCH}^{(1)} = n_{ECCE,q} + n_{PRB,q} + No \quad \text{[Equation 7]}$$

Herein, $n_{ECCE,q}$ is a number indicating a first ECCE in which a corresponding EPDCCH is detected in an EPDCCH q, $n_{PRB,q}$ is an index of a PRB pair in which a corresponding EPDCCH is detected, and No is an offset which is given in an EPDCCH configuration.

Alternatively, $n_{ECCE,q}$ may be a value acquired from a number indicating a first ECCE in which a corresponding EPDCCH is detected. $n_{PRB,q}$ may be a value acquired from a number indicating a first PRB or last PRB of an EPDCCH q.

For another example, a resource index $n^{(1)}_{PUCCH}$ may be defined as follows.

$$n_{PUCCH}^{(1)} = n_{ECCE,q} + n_{PRB,q} + Mo + No \quad \text{[Equation 8]}$$

Herein, Mo is a value acquired from an offset given by a DL grant on a corresponding EPDCCH.

For another example, a resource index $n^{(1)}_{PUCCH}$ may be defined as follows.

$$n_{PUCCH}^{(1)} \leq n_{PRB,q} + No \quad \text{[Equation 9]}$$

Herein, $n_{PRB,q}$ may be an index of a PRB pair in which a corresponding EPDCCH is detected. Alternatively, $n_{PRB,q}$ may be a value acquired from a first PRB or last PRB of an EPDCCH q. According to this, EPDCCHs in a corresponding PRB pair are defined with the same resource index.

For another example, a resource index $n^{(1)}_{PUCCH}$ may be defined as follows.

$$n_{PUCCH}^{(1)} = n_{PRB,q} + Mo + No \quad \text{[Equation 10]}$$

Now, a method of allocating a PUCCH resource according to a DCI format or a search space type will be described.

Hereinafter, a DCI format X and a DCI format Y indicate two DCI formats which attempt detection on an EPDCCH according to a transmission mode. For example, referring to Table 3, a DCI format 1A and a DC1 format 2B may be monitored in a transmission mode 8.

A PUCCH resource may be allocated differently according to a DCI format.

Figure 12:
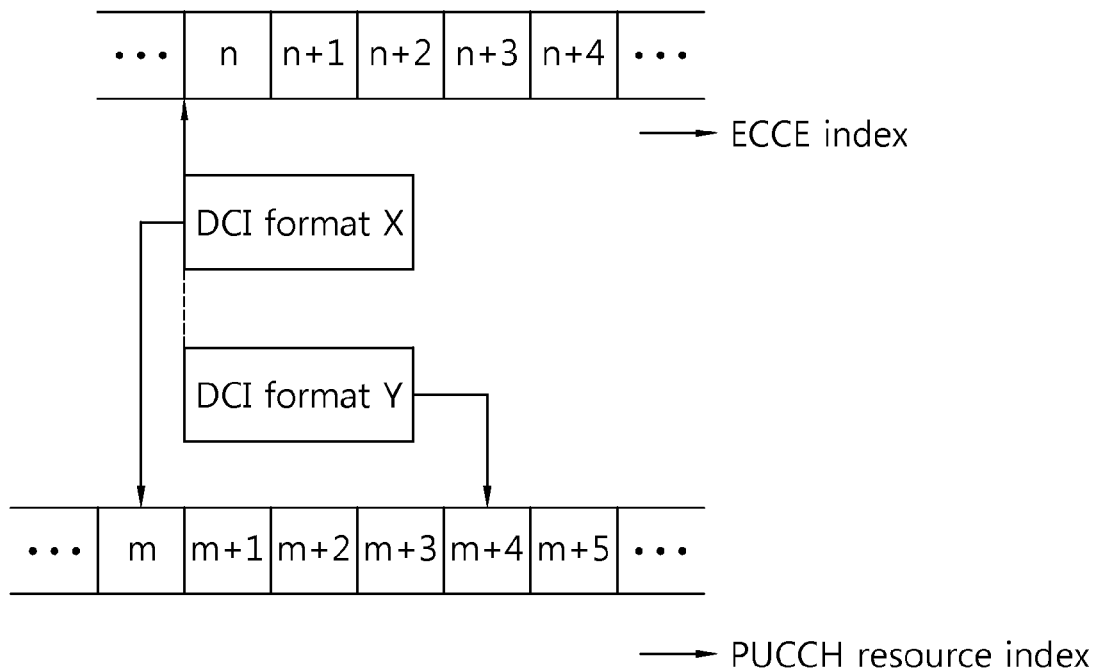
FIG. 12 shows an example of a PUCCH resource allocation.

FIG. 12 shows an example of a PUCCH resource allocation.

In this example, it is defined such that, upon detection of a DCI format X, $n^{(1)}_{PUCCH,X} = n_{ECCE} + N^{(1)}_{PUCCH}$, and upon detection of a DCI format Y, $n^{(1)}_{PUCCH} = n_{ECCE} + F + N^{(1)}_{PUCCH}$. In this case, F is an offset which is given as F=4.

Assume that an EPDCCH is detected in a first ECCE index n. Upon detection of a DCI format X, $n^{(1)}_{PUCCH,X} = m$. Upon detection of a DCI format Y, $n^{(1)}_{PUCCH,X} = m+4$.

Now, it is assumed that two resources configured to determine a PUCCH are a PUCCH resource X and a PUCCH resource Y. The PUCCH resource X/Y may be acquired dynamically by a PDCCH/EPDCCH resource, or may be predetermined by a higher layer. For example, the PUCCH resource X may be determined dynamically by the EPDCCH resource, and the PUCCH resource Y may be predetermined by a BS. Alternatively, as shown in the example of FIG. 12, the PUCCH resources X and Y may be both dynamically determined, and may have different offsets.

The following tables show various examples in which a PUCCH resource varies according to whether a search space in which a PDCCH or an EPDCCH is detected is a common search space (CSS) or a UE-specific search space (USS).

TABLE 7

| | DCI format X | DCI format Y |
|---|---|---|
| CSS | PUCCH resource X | PUCCH resource Y |
| USS | PUCCH resource Y | PUCCH resource Y |

TABLE 8

| | DCI format X | DCI format Y |
|---|---|---|
| CSS | PUCCH resource X | PUCCH resource X |
| USS | PUCCH resource Y | PUCCH resource Y |

TABLE 9

| | DCI format X | DCI format Y |
|---|---|---|
| CSS | PUCCH resource X | PUCCH resource Y |
| USS | PUCCH resource X | PUCCH resource Y |

TABLE 10

| | DCI format X | DCI format Y |
|---|---|---|
| CSS | N/A | N/A |
| USS | PUCCH resource X | PUCCH resource Y |

The following is a possible combination when a PDCCH and an EPDCCH are configured in one subframe.

TABLE 11

| | DCI format X | DCI format Y |
|---|---|---|
| CSS/PDCCH | PUCCH resource X | PUCCH resource X |
| CSS/EPDCCH | PUCCH resource Y | PUCCH resource Y |
| USS/PDCCH | PUCCH resource X | PUCCH resource X |
| USS/EPDCCH | PUCCH resource Y | PUCCH resource Y |

The DCI format may be classified into a format (e.g., a DCI format 1A) in which monitoring is always achieved irrespective of a transmission mode (this is called a fallback DCI format) and a format (e.g., a DCI format 2B, etc.) which is dependent on the transmission mode (this is called a transmission (TM) DCI format).

In the above embodiment, the DCI format X may correspond to a fallback DCI format, and the DCI format Y may correspond to a TM DCI format.

The embodiments of Table 7 to Table 11 may be used either independently or in combination. The embodiment of Table 7 may be applied in a specific subframe, and the embodiment of Table 8 may be applied in another subframe.

Figure 13:
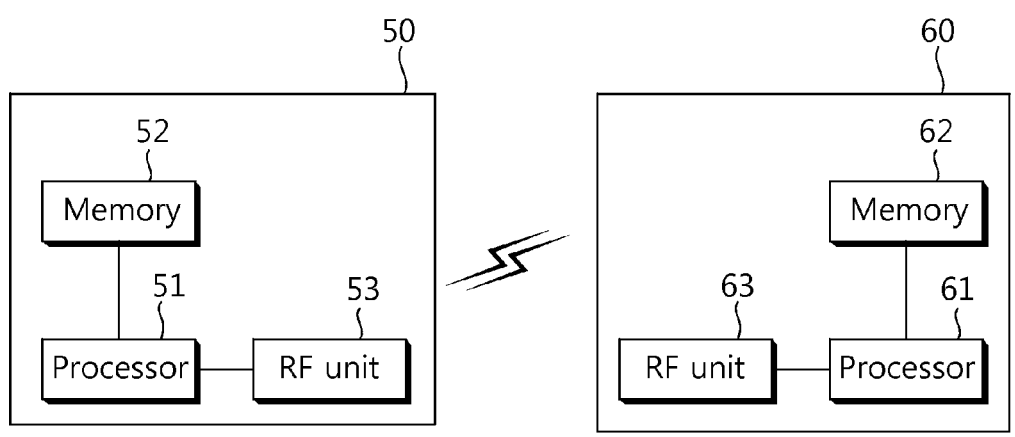
FIG. 13 is a block diagram showing a wireless communication system according to an embodiment of the present invention.

FIG. 13 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiment, an operation of the BS may be implemented by the processor 51. The processor 51 may configure an EPDCCH, and may transmit the EPDCCH and/or a PDCCH. The processor 51 may support an HARQ operation, and may receive HARQ ACK/NACK.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiment, an operation of the wireless device may be implemented by the processor 60. The processor 61 may monitor an EPDDCH, and may transmit HARQ ACK/NACK.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for transmitting hybrid automatic repeat request (HARQ) positive-acknowledgement (ACK)/negative-acknowledgement (NACK) in a wireless communication system, the method comprising:
   receiving, by a wireless device, downlink control information through a downlink control channel;
   receiving, by the wireless device, a downlink transport block on a downlink shared channel according to the downlink control information; and
   transmitting, by the wireless device, ACK/NACK for the downlink transport block on an uplink control channel,
   wherein a radio resource for the uplink control channel is determined according to a format of the downlink control information and a type of a search space in which the downlink control channel is detected.

2. The method of claim 1, wherein the format of the downlink control information is either a first format which does not depend on a transmission mode of the wireless device or a second format which depends on the transmission mode of the wireless device,
   wherein if the format of the downlink control information is the first format, the radio resource for the uplink control channel is determined based on a first resource index, and
   wherein if the format of the downlink control information is the second format, the radio resource for the uplink control channel is determined based on a second resource index.

3. The method of claim 2, wherein the first resource index and the second resource index are acquired from a resource of the downlink control channel.

4. The method of claim 3, wherein the second resource index and the first resource index have different offsets.

5. The method of claim 2, wherein the first resource index is acquired from a resource of the downlink control channel, and
   wherein the second resource index is pre-defined.

6. The method of claim 2, wherein the first resource index is pre-defined, and
   wherein the second resource index is acquired from a resource of the downlink control channel.

7. The method of claim 1, wherein the search space is a common search space or a user equipment-specific search space.

8. The method of claim 1, wherein the search space is defined by one or more physical resource block (PRB) pairs.

9. The method of claim 1, wherein orthogonal frequency division multiplexing (OFDM) symbols on which the downlink control channel is received and OFDM symbols on which the downlink shared channel overlap partially or entirely.

10. A wireless device for transmitting hybrid automatic repeat request (HARD) positive-acknowledgement (ACK)/negative-acknowledgement (NACK) in a wireless communication system, the wireless device comprising:
    a radio frequency (RF) unit configured to transmit and receive a radio signal; and
    a processor operatively coupled to the RF unit and configured to:
    receive downlink control information through a downlink control channel;

receive a downlink transport block on a downlink shared channel according to the downlink control information; and transmit ACK/NACK for the downlink transport block on an uplink control channel, wherein a radio resource for the uplink control channel is determined according to a format of the downlink control information and a type of a search space in which the downlink control channel is detected.

11. The wireless device of claim 10, wherein the format of the downlink control information is either a first format which does not depend on a transmission mode of the wireless device or a second format which depends on the transmission mode of the wireless device, wherein if the format of the downlink control information is the first format, the radio resource for the uplink control channel is determined based on a first resource index, and wherein if the format of the downlink control information is the second format, the radio resource for the uplink control channel is determined based on a second resource index.

12. The wireless device of claim 11, wherein the first resource index and the second resource index are acquired from a resource of the downlink control channel.

13. The wireless device of claim 12, wherein the second resource index and the first resource index have different offsets.

14. The wireless device of claim 11, wherein the first resource index is acquired from a resource of the downlink control channel, and wherein the second resource index is pre-defined.

15. The wireless device of claim 11, wherein the first resource index is pre-defined, and wherein the second resource index is acquired from a resource of the downlink control channel.

16. The wireless device of claim 10, wherein the search space is a common search space or a user equipment-specific search space.

17. The wireless device of claim 10, wherein the search space is defined by one or more physical resource block (PRB) pairs.

18. The wireless device of claim 10, wherein orthogonal frequency division multiplexing (OFDM) symbols on which the downlink control channel is received and OFDM symbols on which the downlink shared channel overlap partially or entirely.

* * * * *